(12) United States Patent
Kamiyama et al.

(10) Patent No.: US 8,661,993 B2
(45) Date of Patent: Mar. 4, 2014

(54) HEAVY FUEL-FIRED BOILER SYSTEM AND OPERATING METHOD THEREOF

(75) Inventors: Naoyuki Kamiyama, Hiroshima (JP);
 Tomoo Akiyama, Hiroshima (JP);
 Toshihiko Setoguchi, Nagasaki (JP);
 Koutaro Fujimura, Nagasaki (JP);
 Yoshihisa Yamamoto, Nagasaki (JP);
 Koichi Tagami, Nagasaki (JP);
 Yasutoshi Ueda, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 586 days.

(21) Appl. No.: 12/809,347

(22) PCT Filed: Feb. 9, 2009

(86) PCT No.: PCT/JP2009/052166
 § 371 (c)(1),
 (2), (4) Date: Jun. 18, 2010

(87) PCT Pub. No.: WO2009/101918
 PCT Pub. Date: Aug. 20, 2009

(65) Prior Publication Data
 US 2010/0269740 A1   Oct. 28, 2010

(30) Foreign Application Priority Data
 Feb. 12, 2008  (JP) .................. 2008-030721

(51) Int. Cl.
 *F23J 3/00*   (2006.01)
(52) U.S. Cl.
 USPC ........... 110/216; 110/210; 110/265; 110/266; 110/345; 110/347; 73/23.33; 73/28.01
(58) Field of Classification Search
 USPC ......... 110/216, 345, 188, 266, 347, 265, 346, 110/210; 431/12; 73/28.01, 28.04, 863.25, 73/23.33
 See application file for complete search history.

(56) References Cited

U.S. PATENT DOCUMENTS 4,343,606 A * 8/1982 Blair et al. .................. 431/10
4,782,772 A * 11/1988 Chughtai et al. .............. 110/345
(Continued)

FOREIGN PATENT DOCUMENTS

JP    58-52410 U     4/1983
JP    9250708 A *   9/1997   ............. F23C 99/00
(Continued)

OTHER PUBLICATIONS

International Search Report of PCT/JP2009/052166, mailing date of Mar. 10, 2009.

*Primary Examiner* — Kenneth Rinehart
*Assistant Examiner* — Bao D Nguyen
(74) *Attorney, Agent, or Firm* — Westerman, Hattori, Daniels & Adrian, LLP

(57) ABSTRACT

In an exhaust gas treatment system including a denitration device that removes nitrogen oxide in exhaust gas from a heavy fuel-fired boiler, an air preheater that recovers heat in the gas after the nitrogen oxide is removed, an electric precipitator that removes dust while adding ammonia into the gas after heat recovery, a desulfurization device that removes sulfur oxide in the gas after dust removal, and a stack that exhausts the gas after desulfurization to the outside, an ash-shear-force measuring instrument is provided to measure an ash shear force, which is ash flowability, on the downstream side of the electric precipitator, so that a feed rate of an air supply unit that supplies air to the boiler is reduced according to ash shear-force information.

10 Claims, 5 Drawing Sheets

(56) References Cited

U.S. PATENT DOCUMENTS

| | | | |
|---|---|---|---|
| 4,843,980 A * | 7/1989 | Markham et al. | 110/342 |
| 4,969,408 A * | 11/1990 | Archer et al. | 110/347 |
| 4,979,447 A * | 12/1990 | Farrar | 110/345 |
| 5,309,850 A * | 5/1994 | Downs et al. | 110/235 |
| 5,320,051 A * | 6/1994 | Nehls, Jr. | 110/345 |
| 5,571,946 A * | 11/1996 | Koshi et al. | 73/28.01 |
| 5,958,335 A * | 9/1999 | Okazoe et al. | 422/13 |
| 6,067,914 A * | 5/2000 | Hums et al. | 110/342 |
| 6,096,279 A * | 8/2000 | Iwashita et al. | 423/242.1 |
| 6,638,485 B1 * | 10/2003 | Iida et al. | 423/210 |
| 6,773,680 B2 * | 8/2004 | Shimizu et al. | 422/173 |
| 6,863,875 B1 * | 3/2005 | Kotake et al. | 423/235 |
| 7,507,381 B2 * | 3/2009 | Muramoto et al. | 422/173 |
| 7,758,835 B2 * | 7/2010 | Luomaharju et al. | 423/215.5 |
| 7,776,141 B2 * | 8/2010 | Wu et al. | 96/150 |
| 7,833,501 B2 * | 11/2010 | Kobayashi et al. | 423/210 |
| 2004/0141891 A1 * | 7/2004 | Abe et al. | 422/190 |
| 2005/0201914 A1 * | 9/2005 | Ritzenthaler | 423/230 |
| 2008/0250990 A1 * | 10/2008 | Jia et al. | 110/347 |
| 2009/0031933 A1 * | 2/2009 | Ookawa et al. | 110/345 |
| 2010/0101462 A1 * | 4/2010 | Hayashi et al. | 110/190 |

FOREIGN PATENT DOCUMENTS

| | | |
|---|---|---|
| JP | 10-235226 A | 9/1998 |
| JP | 11-94234 A | 4/1999 |
| JP | 2002-243108 A | 8/2002 |
| JP | 2002-282650 A | 10/2002 |
| JP | 2007107757 A | 4/2007 |

* cited by examiner

HEAVY FUEL-FIRED BOILER SYSTEM AND OPERATING METHOD THEREOF

TECHNICAL FIELD

The present invention relates to a heavy fuel-fired boiler system that decreases ash deposition even when low-grade fuel such as heavy oil is used, and an operating method thereof.

BACKGROUND ART

Conventionally, it is well-known that when, for example, a petroleum residue is used as low-grade fuel, vanadium in the petroleum residue fuel generates a low melting compound, and the low melting compound exhibits a binding effect to cause an ash deposition phenomenon to a heat-transfer pipe in a boiler.

An additive such as MgO is added to the petroleum residue. On the other hand, a measure against ash deposition has been taken with respect to a biomass fuel by co-combustion with coal (Patent Documents 1 and 2).

Patent Document 1: Japanese Patent Application Laid-open No. 2002-243108
Patent Document 2: Japanese Patent Application Laid-open No. 2007-107757

DISCLOSURE OF INVENTION

Problem to be Solved by the Invention

In the conventional heavy fuel-fired boiler, an air feed rate is controlled appropriately in accordance with a set value of $O_2$ concentration at an outlet of the boiler so that there is no risk of accidental fire in the boiler. In the heavy fuel-fired boiler using, for example, a vacuum residual oil (VR), petroleum coke, or pitch, there can be troubles due to deposition of generated fly ash on a downstream device. Then, stable driving is impeded, a huge operating loss is generated in power generation, and a cleaning expense accrues. Accordingly, there has been a strong demand for development of a control method of ash deposition.

Further, when an S content in the fuel to be used increases, acidic ammonium sulfate (($NH_4$)$HSO_4$) and ammonium sulfate (($NH_4$)$_2SO_4$) relatively increase due to a reaction with ammonia ($NH_3$) injected into an upstream side of an electric precipitator for preventing corrosion, thereby increasing ash deposition. As a result, deposit to the downstream device (the electric precipitator and an induced draft fan (IDF)) increases, and a trouble of insufficient removal of hopper ash from the electric precipitator or a trouble of increasing vibrations of the IDF can occur.

Further, even if there is no change in the S content in the fuel, when combustibility of the fuel is improved and unburned C content in the ash decreases with respect to the S content, ash deposition increases and it can be a cause of the same troubles.

The amount of fly ash to the downstream side can be decreased by increasing charge to the electric precipitator. However, because unburned C is collected preferentially to the ammonium sulfate content, concentration of the unburned C in the fly ash decreases as a result. This causes to change the fly ash composition (unburned C concentration/S concentration ratio), and increase ash deposition, which can lead to troubles due to the ash deposition (for example, an IDF vibration trouble).

In view of the above problems, an object of the present invention is to provide a heavy fuel-fired boiler system that can reduce ash deposition at the time of performing a burning process using low-grade fuel, and to provide an operating method thereof.

Means for Solving Problem

A heavy fuel-fired boiler system according to an aspect of the present invention includes a denitration device that removes nitrogen oxide in exhaust gas from a heavy fuel-fired boiler, an air preheater that recovers heat in the gas after the nitrogen oxide is removed, an electric precipitator that removes dust while adding ammonia into the gas after heat recovery, a vapor-liquid contact type desulfurization device that removes sulfur oxide in the gas after dust removal, and a stack that exhausts the gas after desulfurization to outside. The heavy fuel-fired boiler system includes an ash flowability measuring instrument that measures flowability of ash on a downstream side of the electric precipitator. The heavy fuel-fired boiler system adjusts a feed rate of an air supply unit that supplies air to a boiler according to ash flowability information.

In the heavy fuel-fired boiler system, advantageously, the ash flowability measuring instrument is an ash shear-force measuring instrument.

In the heavy fuel-fired boiler system, advantageously, an air feed rate is adjusted according to a fuel composition of a heavy fuel.

Advantageously, the heavy fuel-fired boiler system further includes a dust densitometer that measures dust concentration on a downstream side of the electric precipitator for adjusting the air feed rate according to a dust amount.

Advantageously, the heavy fuel-fired boiler system further includes a coal-ash supply unit that supplies coal ash on an upstream side of the electric precipitator for supplying the coal ash according to a dust amount.

An operating method of a heavy fuel-fired boiler system including a boiler using a heavy fuel according to another aspect of the present invention includes measuring ash flowability on a downstream side of an electric precipitator that removes dust in exhaust gas, and adjusting an air feed rate to the boiler by ash flowability information.

In the operating method of a heavy fuel-fired boiler system, advantageously, the ash flowability information is ash shear-force information.

In the operating method of a heavy fuel-fired boiler system, advantageously, an air feed rate is adjusted according to a fuel composition of a heavy fuel.

In the operating method of a heavy fuel-fired boiler system, advantageously, dust concentration is measured on a downstream side of the electric precipitator, and an air feed rate is adjusted according to a dust amount.

In the operating method of a heavy fuel-fired boiler system, advantageously, a coal-ash supply unit is arranged on an upstream side of the electric precipitator to supply coal ash, and the coal ash is supplied according to a dust amount.

Effect of the Invention

According to the present invention, the fly ash composition (unburned C concentration/S concentration ratio) is constant regardless of fuel properties, and troubles due to ash deposition can be prevented.

Figure 1:
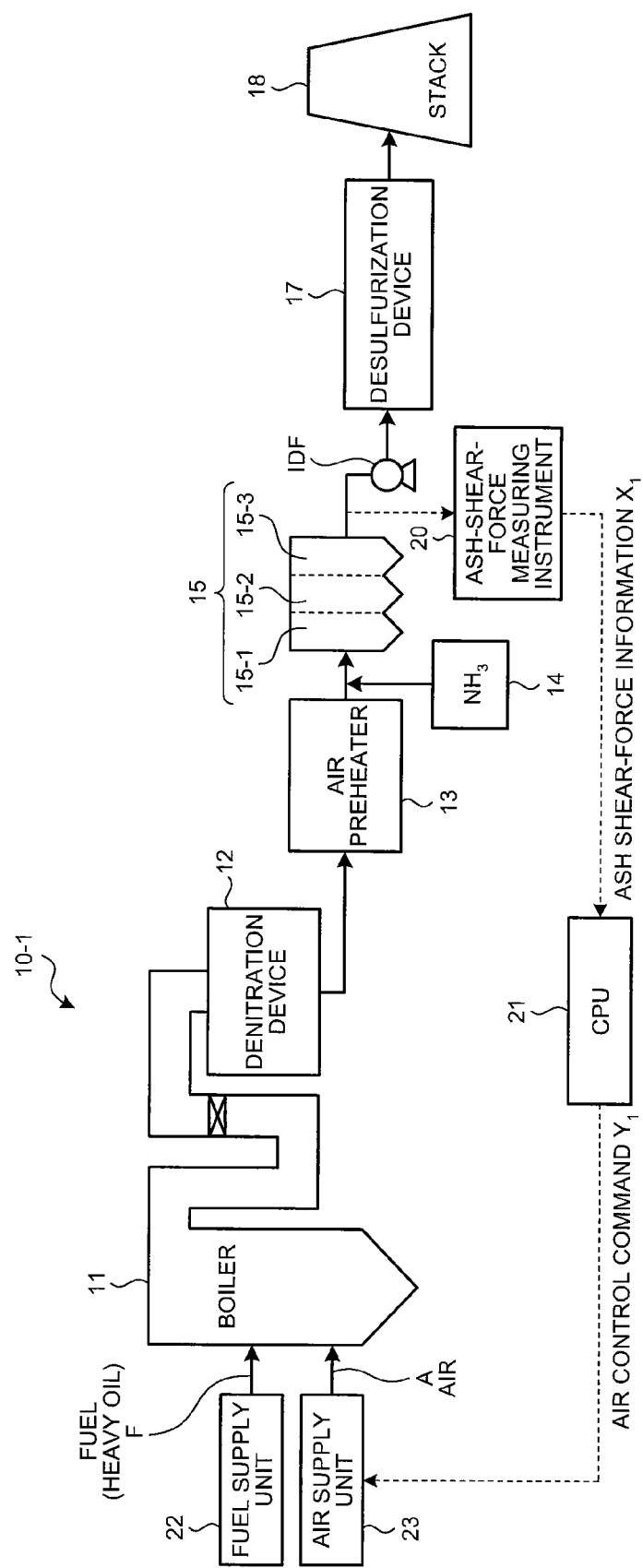
FIG. 1 is a schematic diagram of a heavy fuel-fired boiler system according to a first embodiment.

EXPLANATIONS OF LETTERS OR NUMERALS 10-1 to 10-4 first to fourth heavy fuel-fired boiler system
11 heavy fuel-fired boiler
12 denitration device
13 air preheater
14 ammonia
15 electric precipitator
17 desulfurization device
18 stack
20 ash-shear-force measuring instrument

BEST MODE(S) FOR CARRYING OUT THE INVENTION

The present invention will be explained below in detail with reference to the accompanying drawings. The invention is not limited to the embodiments. In addition, constituent elements in the embodiments may include those that can be easily achieved by those skilled in the art or that are substantially equivalent thereto.

First Embodiment

A heavy fuel-fired boiler system and an operating method thereof according to a first embodiment of the present invention are explained with reference to drawings. FIG. 1 is a schematic configuration diagram of a first heavy fuel-fired boiler system according to the first embodiment.

As shown in FIG. 1, a first heavy fuel-fired boiler system 10-1 according to the present embodiment is an exhaust gas treatment system including a denitration device 12 that removes nitrogen oxide in exhaust gas from a heavy fuel-fired boiler 11, an air preheater 13 that recovers heat in the gas after the nitrogen oxide is removed, an electric precipitator 15 that removes dust while adding ammonia ($NH_3$) 14 into the gas after heat recovery, a desulfurization device 17 that removes sulfur oxide in the gas after dust removal, and a stack 18 that exhausts the gas after desulfurization to the outside, where an ash-shear-force measuring instrument 20 that measures an ash shear force, in other words, flowability of the ash, on the downstream side of the electric precipitator 15 is provided so that a feed rate of an air supply unit 23 that supplies air A to the boiler is reduced according to ash shear-force information $X_1$.

That is, the ash-shear-force measuring instrument 20 obtains information of a shear force in the ash, and the ash shear-force information $X_1$ is consolidated by a central operation control system (CPU) 21.

An air control command $Y_1$ is issued to the air supply unit 23 so that an appropriate air feed rate to the boiler 11 is calculated based on the ash shear-force information $X_1$ to control the air feed rate to the boiler 11.

Figure 5:
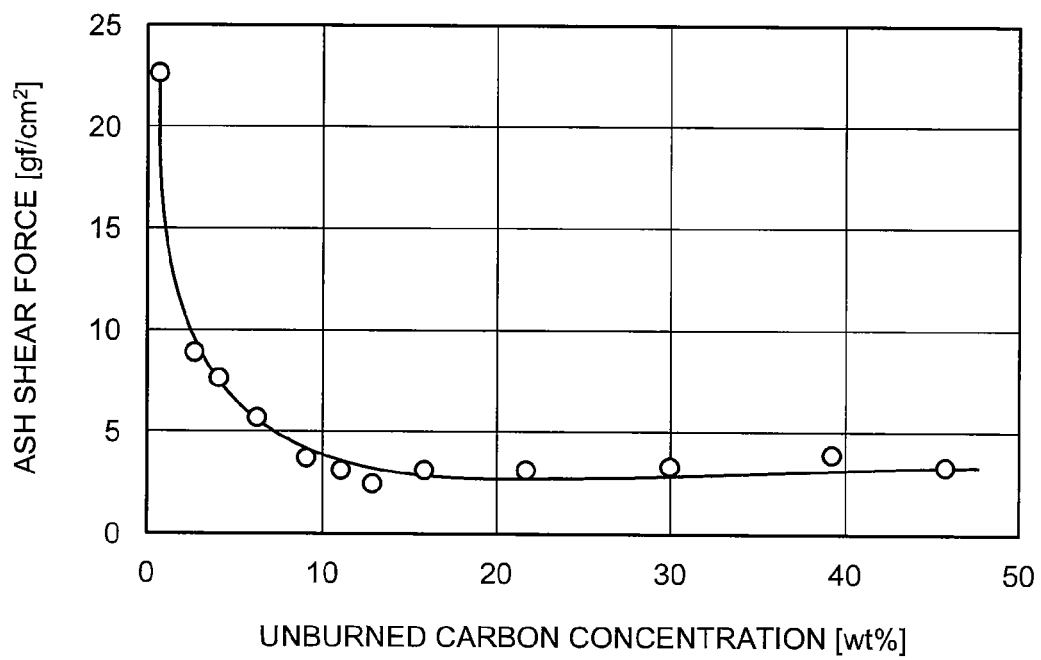
FIG. 5 depicts a relation between unburned carbon concentration and an ash shear force.
Figure 6:
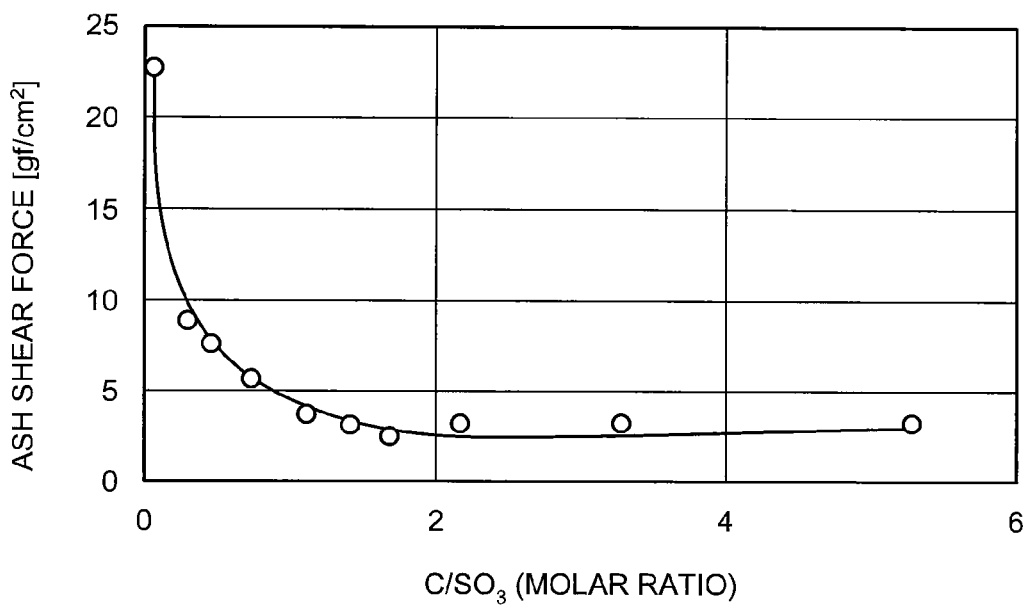
FIG. 6 depicts a relation between $C/SO_3$ (molar ratio) and an ash shear force.

FIG. 5 depicts a relation between unburned C concentration and an ash shear force, and FIG. 6 depicts a relation between $C/SO_3$ (molar ratio) and an ash shear force.

As shown in FIGS. 5 and 6, when the unburned C concentration is low, the ash shear force increases. Therefore, when the ash shear force measured by the ash-shear-force measuring instrument 20 is equal to or higher than a predetermined threshold (for example, 5 gf/cm² or higher in FIG. 5), the CPU 21 issues the air control command $Y_1$ to the air supply unit 23 to increase the unburned C concentration.

In the present embodiment, when the ash shear force is measured, the target ash is filled in a measuring cell. The measuring cell is shifted to the side to measure the shear force in a shear plane. Adhesion and a frictional force between particles in a powder layer are evaluated based on the measured shear force.

According to the present embodiment, by decreasing the air feed rate to the boiler, the unburned C content is increased, and as a result, the unburned C concentration in the fly ash is increased, the unburned C concentration in the ash is increased with respect to the S content, and ash deposition is decreased, thereby allowing to prevent a trouble due to ash deposition (for example, an IDF vibration trouble).

According to the present embodiment, the air content is controlled based on the ash shear force as the ash flowability information. However, the present invention is not limited thereto, and the air feed rate can be adjusted by obtaining parameters such as "loose apparent specific gravity", "solid apparent specific gravity", "condensation", "aggregation", "spatula angle", and "angle of repose" of the ash by, for example, a powder tester or the like that measures physical characteristics of the ash.

The condensation is obtained from the loose apparent specific gravity and the solid apparent specific gravity.

The aggregation is obtained from a weight ratio of powder remained in sieves when a plurality of types of sieves is selected according to a mean value of the loose apparent specific gravity and the solid apparent specific gravity and vibrated.

The spatula angle is a laterally-inclined angle of the powder remained on a spatula when the spatula is lifted up after the ash is piled up on the spatula.

The angle of repose is an angle of a ridge line of the powder deposited by a natural drop.

Second Embodiment

Figure 2:
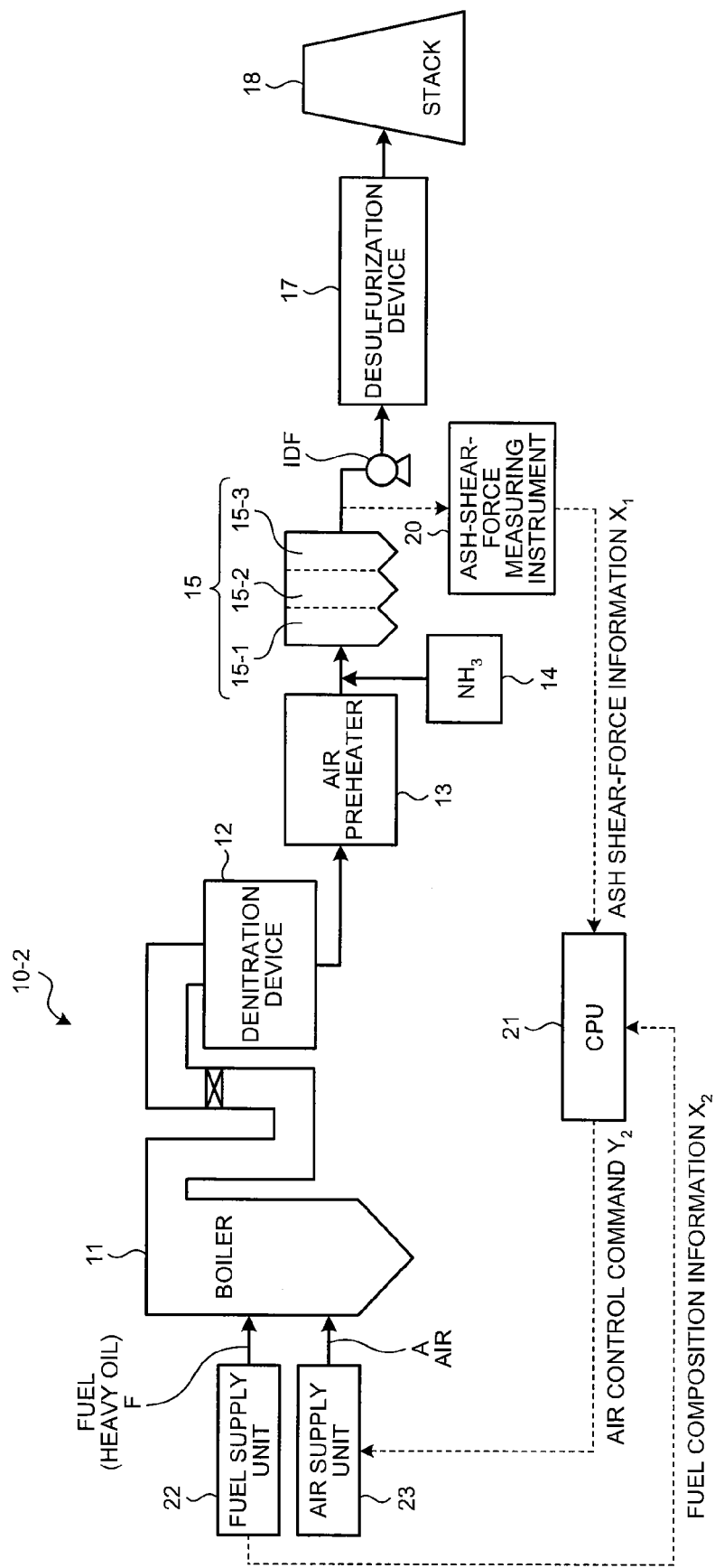
FIG. 2 is a schematic diagram of a heavy fuel-fired boiler system according to a second embodiment.

A heavy fuel-fired boiler system and an operating method thereof according to a second embodiment of the present invention are explained with reference to the drawing. FIG. 2 is a schematic configuration diagram of a second heavy fuel-fired boiler system according to the second embodiment.

As shown in FIG. 2, based on the boiler system 10-1 according to the first embodiment, a second heavy fuel-fired boiler system 10-2 according to the present embodiment issues an air control command $Y_2$ for adjusting an air content A supplied from the air supply unit 23 by the CPU 21 based on fuel composition information $X_2$ of the fuel F supplied from a fuel supply unit 22.

According to the present embodiment, by decreasing the air content to the boiler according to the composition (S content, ash content, vanadium content, composition data, and the like) of the heavy fuel in addition to the ash flowability information, the unburned C content is increased, and as a result, the unburned C concentration in the fly ash is increased, the unburned C concentration in the ash is increased with respect to the S content, and ash deposition is decreased, thereby allowing to prevent a trouble due to ash deposition (for example, an IDF vibration trouble).

Third Embodiment

Figure 3:
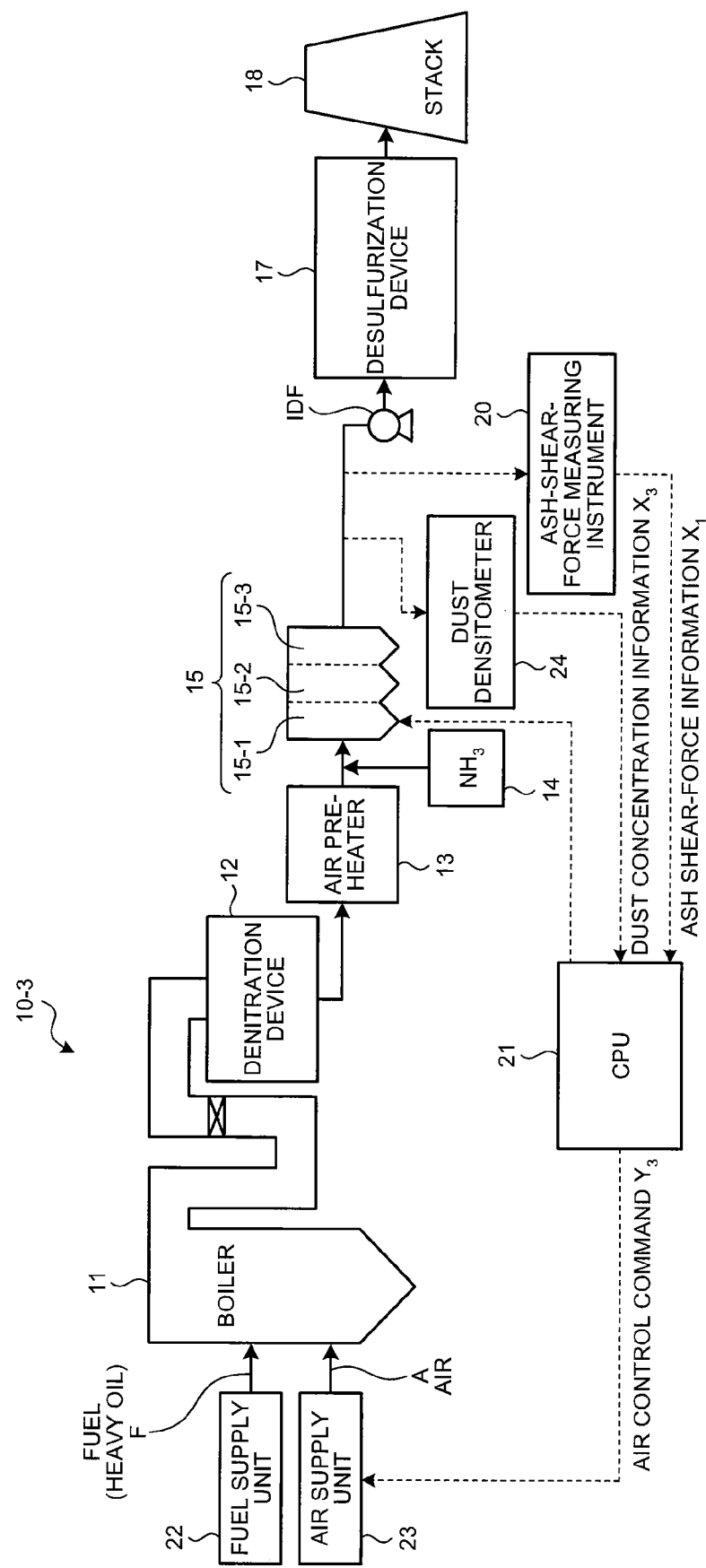
FIG. 3 is a schematic diagram of a heavy fuel-fired boiler system according to a third embodiment.

A heavy fuel-fired boiler system and an operating method thereof according to a third embodiment of the present invention are explained with reference to the drawing. FIG. 3 is a schematic configuration diagram of a third heavy fuel-fired boiler system according to the third embodiment.

As shown in FIG. 3, a third heavy fuel-fired boiler system 10-3 according to the present embodiment includes a dust densitometer 24 that measures dust concentration on the downstream side of the electric precipitator 15 configured as in the boiler system 10-1 according to the first embodiment, to adjust the air feed rate according to the dust amount.

In the present embodiment, the dust densitometer 24 obtains a fly ash amount on the downstream side of the electric precipitator 15, other than the ash flowability information and the heavy fuel composition information.

The obtained dust concentration information (information of fly ash amount) $X_3$ is consolidated by the central operation control system (CPU) 21.

An air control command $Y_3$ is issued to the air supply unit 23 so that an appropriate air feed rate to the boiler 11 is calculated based on the ash shear-force information $X_1$ and the dust concentration information $X_3$ to control the air feed rate to the boiler 11.

The third heavy fuel-fired boiler system 10-3 has a function of calculating an appropriate electric charge of the electric precipitator (EP) based on the ash shear-force information $X_1$ to control a dust collection amount in respective chambers (15-1, 15-2, and 15-3) of the electric precipitator 15.

As a result, the ash deposition can be decreased by increasing and appropriately controlling an unburned C concentration/S concentration ratio in the fly ash at an outlet of the electric precipitator 15.

Specifically, by decreasing a collection amount of the unburned C in the first chamber 15-1 of the electric precipitator 15 and introducing the unburned C into the second and third chambers 15-2 and 15-3, a trouble of insufficient removal of EP ash and a vibration trouble of the IDF can be prevented.

According to the present embodiment, the fly ash composition (unburned C concentration/S concentration ratio) is constant regardless of the fuel properties, and troubles due to ash deposition can be prevented.

As a method of dropping a current in the electric precipitator 15, there are mainly the following methods.

(1) Continuous charging: a method of dropping a set value of the current and charging a constant current by the set current value.

(2) Intermittent charging: a method of dropping an average current by intermittently turning the charge ON and OFF.

Even if the charge is turned OFF by the intermittent charging, the electric precipitator 15 itself functions as a capacitor, and thus a time constant of voltage decay is long and a certain amount of current remains even when the charge is turned OFF, which is effective for decreasing power consumption.

Further, in the case of the intermittent charging, the voltage at the time of ON is the same as that of a rated current. Accordingly, the performance is better than the case of simply dropping the current.

Further, adjustment of the electric charge of the electric precipitator 15 is explained.

In the charge adjustment, it is required that a collecting performance in an upstream chamber, which is the first chamber 15-1 constituting the electric precipitator 15, is suppressed to be low and a boiler dust that can be collected more easily than ammonium sulfate can reach the downstream chambers (second and third chambers 15-2 and 15-3).

Normally, therefore, the current in the first chamber 15-1 is dropped to about ½ of the rated current. At the time of this operation, it is estimated how much the total performance of the electric precipitator 15 is degraded by dropping the electric charge in the first chamber 15-1 based on data of the dust concentration at the inlet and the outlet of the electric precipitator 15, to drop the current within a range that degradation of the performance is below a power assurance value. For example, as a criterion for dropping the current value, ½, ⅓, or ¼ of the rated current is used.

Further, if the electric precipitator 15 has only a limited performance due to controlled electric charges, dust removal may also be performed in the desulfurization device 17 by absorption.

Fourth Embodiment

Figure 4:
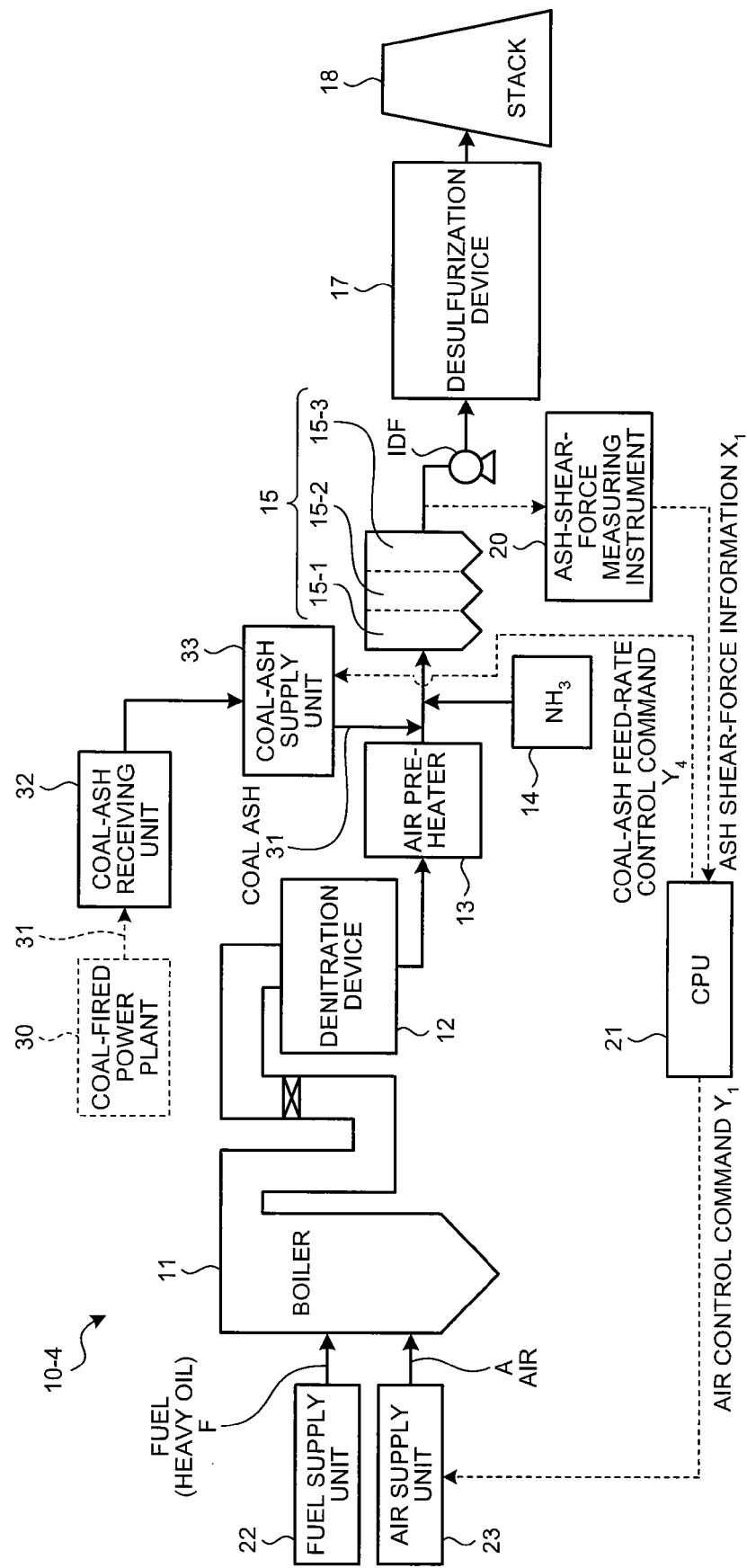
FIG. 4 is a schematic diagram of a heavy fuel-fired boiler system according to a fourth embodiment.

A heavy fuel-fired boiler system and an operating method thereof according to a fourth embodiment of the present invention are explained with reference to the drawing. FIG. 4 is a schematic configuration diagram of a fourth heavy fuel-fired boiler system according to the fourth embodiment.

As shown in FIG. 4, a fourth heavy fuel-fired boiler system 10-4 according to the present embodiment is configured similarly to the boiler system 10-1 according to the first embodiment, and includes a coal-ash supply unit 33, to which coal ash 31 is supplied from a coal-ash receiving unit 32, on the upstream side of the electric precipitator 15, so that the coal ash 31 is supplied thereto according to the dust amount.

In the present embodiment, when there is a coal-fired power plant 30 in a facility, ash deposition is decreased by using the coal ash 31 generated in the coal-fired power plant 30.

The coal-ash supply unit 33 such as a hopper and a feeder receives the coal ash 31 from the outside and injects the coal ash 31 into a flue.

An appropriate coal-ash injection volume of the coal ash 31 to be injected can be calculated from the ash deposition data. Based on a result of calculation, the central operation control system (CPU) 21 can issue a coal-ash feed-rate control command $Y_4$.

Troubles due to ash deposition (for example, an IDF vibration trouble) can be prevented by increasing the unburned C content by combining the second and third embodiments with the present embodiment to decrease ash deposition.

INDUSTRIAL APPLICABILITY

As described above, according to the heavy fuel-fired boiler system according to the present invention, the fly ash composition (unburned C concentration/S concentration ratio) is constant regardless of the fuel properties, and troubles due to ash deposition can be prevented, thereby allowing to perform stable boiler operation for a long period of time.

The invention claimed is:

1. A heavy fuel-fired boiler system comprising:
a denitration device that removes nitrogen oxide in exhaust gas from a heavy fuel-fired boiler using a heavy fuel;
an air preheater that recovers heat in the gas after the nitrogen oxide is removed;
an electric precipitator that removes dust while adding ammonia into the gas after heat recovery;

a vapor-liquid contact type desulfurization device that removes sulfur oxide in the gas after dust removal;

a stack that exhausts the gas after desulfurization to outside;

an ash flowability measuring instrument that measures ash flowability on a downstream side of the electric precipitator, the ash flowability indicating a physical property of the gas after dust removal;

an air supply unit for supplying air to the heavy fuel-fired boiler; and a controller for adjusting an air feed rate to the boiler based on information of the measured ash flowability so that the ash flowability is within a predetermined threshold and unburned C concentration/S concentration ratio is constant.

2. The heavy fuel-fired boiler system according to claim 1, wherein the ash flowability measuring instrument is an ash shear-force measuring instrument.

3. The heavy fuel-fired boiler system according to claim 1, wherein an air feed rate is adjusted according to a fuel composition of a heavy fuel.

4. The heavy fuel-fired boiler system according to claim 1, comprising a dust densitometer that measures dust concentration on a downstream side of the electric precipitator for adjusting the air feed rate according to a dust amount.

5. The heavy fuel-fired boiler system according to claim 1, further comprising a coal-ash supply unit that supplies coal ash on an upstream side of the electric precipitator for supplying the coal ash according to a dust amount.

6. An operating method of a heavy fuel-fired boiler system including a boiler using a heavy fuel, the method comprising:

measuring ash flowability on a downstream side of an electric precipitator that removes dust in exhaust gas, the ash flowability indicating a physical property of the exhaust gas after dust removal and adjusting an air feed rate to the boiler based on information of the measured ash flowability so that the ash flowability is within a predetermined threshold and unburned C concentration/S concentration ratio is constant.

7. The operating method of a heavy fuel-fired boiler system according to claim 6, wherein the ash flowability information is ash shear-force information.

8. The operating method of a heavy fuel-fired boiler system according to claim 6, wherein an air feed rate is adjusted according to a fuel composition of a heavy fuel.

9. The operating method of a heavy fuel-fired boiler system according to claim 6, wherein dust concentration is measured on a downstream side of the electric precipitator, and an air feed rate is adjusted according to a dust amount.

10. The operating method of a heavy fuel-fired boiler system according to claim 6, wherein a coal-ash supply unit is arranged on an upstream side of the electric precipitator to supply coal ash, and the coal ash is supplied according to a dust amount.

* * * * *